US010292204B2

(12) United States Patent
Yanagi et al.

(10) Patent No.: US 10,292,204 B2
(45) Date of Patent: May 14, 2019

(54) WIRELESS COMMUNICATION DEVICE AND WIRELESS COMMUNICATION SYSTEM

(71) Applicant: FUJITSU COMPONENT LIMITED, Tokyo (JP)

(72) Inventors: Masahiro Yanagi, Tokyo (JP); Kimihiro Maruyama, Tokyo (JP); Tatsuya Kakehashi, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 36 days.

(21) Appl. No.: 15/609,873

(22) Filed: May 31, 2017

(65) Prior Publication Data

US 2018/0014352 A1 Jan. 11, 2018

(30) Foreign Application Priority Data

Jul. 5, 2016 (JP) .................................. 2016-133768

(51) Int. Cl.
*H04W 84/20* (2009.01)
*H04L 1/16* (2006.01)
(Continued)

(52) U.S. Cl.
CPC ........... *H04W 84/20* (2013.01); *H04L 1/1671* (2013.01); *H04L 1/1678* (2013.01);
(Continued)

(58) Field of Classification Search
CPC .................................................... H04W 74/06
See application file for complete search history.

(56) References Cited

U.S. PATENT DOCUMENTS

2005/0030933 A1\* 2/2005 Seyama ................ H04W 74/06
370/346
2006/0040705 A1 2/2006 Kawakami et al.
(Continued)

FOREIGN PATENT DOCUMENTS

JP H06-350605 12/1994
JP 2001-237764 8/2001
(Continued)

OTHER PUBLICATIONS

Japanese Platform for Patent Information, Publication No. 2009-77296, published Apr. 9, 2009.
(Continued)

*Primary Examiner* — Brandon M Renner
*Assistant Examiner* — The Hy Nguyen
(74) *Attorney, Agent, or Firm* — Staas & Halsey LLP

(57) ABSTRACT

A wireless communication device that communicates with a plurality of slave units, including: a transmitter that transmits a data transmission instruction including a first identification information of a single slave unit among the plurality of slave units; a receiver that receives data corresponding to the data transmission instruction from the single slave unit; wherein the transmitter transmits to the plurality of slave units acknowledgment data which has incorporated second identification information into an acknowledgment to the data received from the single slave unit, the second identification information indicating another slave unit which transmits data corresponding to a next data transmission instruction to the wireless communication device.

7 Claims, 9 Drawing Sheets

(51) Int. Cl.
    *H04L 1/18* (2006.01)
    *H04Q 9/00* (2006.01)
    *H04W 74/06* (2009.01)
    *H04L 1/00* (2006.01)

(52) U.S. Cl.
    CPC .......... *H04L 1/1848* (2013.01); *H04L 1/1858* (2013.01); *H04L 1/1864* (2013.01); *H04L 1/1887* (2013.01); *H04Q 9/00* (2013.01); *H04W 74/06* (2013.01); *H04L 2001/0092* (2013.01); *H04L 2001/0093* (2013.01); *H04Q 2209/40* (2013.01); *H04Q 2209/43* (2013.01); *H04Q 2209/75* (2013.01); *H04Q 2209/883* (2013.01)

(56) References Cited

U.S. PATENT DOCUMENTS

| | | | |
|---|---|---|---|
| 2006/0193279 A1* | 8/2006 | Gu | H04W 74/06 370/312 |
| 2006/0221993 A1 | 10/2006 | Liao et al. | |
| 2009/0080494 A1 | 3/2009 | Kurashima et al. | |
| 2012/0163279 A1 | 6/2012 | Tran et al. | |
| 2017/0366307 A1* | 12/2017 | Xing | H04W 76/15 |

FOREIGN PATENT DOCUMENTS

| | | |
|---|---|---|
| JP | 2004-158965 | 6/2004 |
| JP | 2006-50461 | 2/2006 |
| JP | 2009-77296 | 4/2009 |
| JP | 2009-260720 | 11/2009 |

OTHER PUBLICATIONS

English Abstract for Japanese Publication No. 2001-237764, published Aug. 31, 2001.
Japanese Platform for Patent Information, Publication No. 2006-50461, published Feb. 16, 2006.
Japanese Platform for Patent Information, Publication No. 2009-260720, published Nov. 5, 2009.
Extended European Search Report for European Patent Application No. 17174065.7, dated Nov. 9, 2017.
J-PlatPat English Abstract for Japanese Patent Application Publication No. 2004-158965, published Jun. 3, 2004.
J-PlatPat English Abstract for Japanese Patent Application Publication No. 06-350605, published Dec. 22, 1994.

* cited by examiner

WIRELESS COMMUNICATION DEVICE AND WIRELESS COMMUNICATION SYSTEM

CROSS-REFERENCE TO RELATED APPLICATION

This application is based upon and claims the benefit of priority of the prior Japanese Patent Application No. 2016-133768 filed on Jul. 5, 2016, the entire contents of which are incorporated herein by reference.

FIELD

A certain aspect of the embodiments is related to a wireless communication device and a wireless communication system.

BACKGROUND

Conventionally, there has been known a wireless communication system in which devices communicate with each other by a short range wireless communication technique (e.g. see Japanese Laid-open Patent Publication No. 2009-77296).

In a Japanese wireless radio act, before a transmitter performing wireless communication begins the transmission of an electric wave, it is necessary to check whether a channel to be used is used for the transmission with another transmitter based on an intended use and a use frequency band. This is called a carrier sense. If the channel to be used is in use by the another transmitter, the transmitter cannot perform the transmission by using the channel, and the transmitter needs to perform the transmission after the another transmitter completes the transmission or to perform the transmission by using another channel. Here, also when the another channel is used, it is necessary to perform the carrier sense with the use of the another channel again before the transmission.

SUMMARY

According to an aspect of the present invention, there is provided a wireless communication device that communicates with a plurality of slave units, including: a transmitter that transmits a data transmission instruction including a first identification information of a single slave unit among the plurality of slave units; a receiver that receives data corresponding to the data transmission instruction from the single slave unit; wherein the transmitter transmits to the plurality of slave units acknowledgment data which has incorporated second identification information into an acknowledgment to the data received from the single slave unit, the second identification information indicating another slave unit which transmits data corresponding to a next data transmission instruction to the wireless communication device.

According to another aspect of the present invention, there is provided a wireless communication system having a master unit and a plurality of slave units, including: the master unit including: a first transmitter that transmits a data transmission instruction including a first identification information of a single slave unit among the plurality of slave units; a first receiver that receives data corresponding to the data transmission instruction from the single slave unit; wherein the first transmitter transmits to the plurality of slave units acknowledgment data which has incorporated second identification information into an acknowledgment to the single slave unit, the second identification information indicating another slave unit which transmits data corresponding to a next data transmission instruction to the master unit, each of the plurality of slave units including: a second receiver that receives the data transmission instruction including the first identification information of the single slave unit, and the acknowledgment data; and a second transmitter that transmits the data corresponding to the data transmission instruction to the master unit when each of the plurality of slave unit is the single slave unit corresponding to the first identification information, and transmits the data corresponding to the next data transmission instruction to the master unit when each of the plurality of slave unit is the another slave unit corresponding to the second identification information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
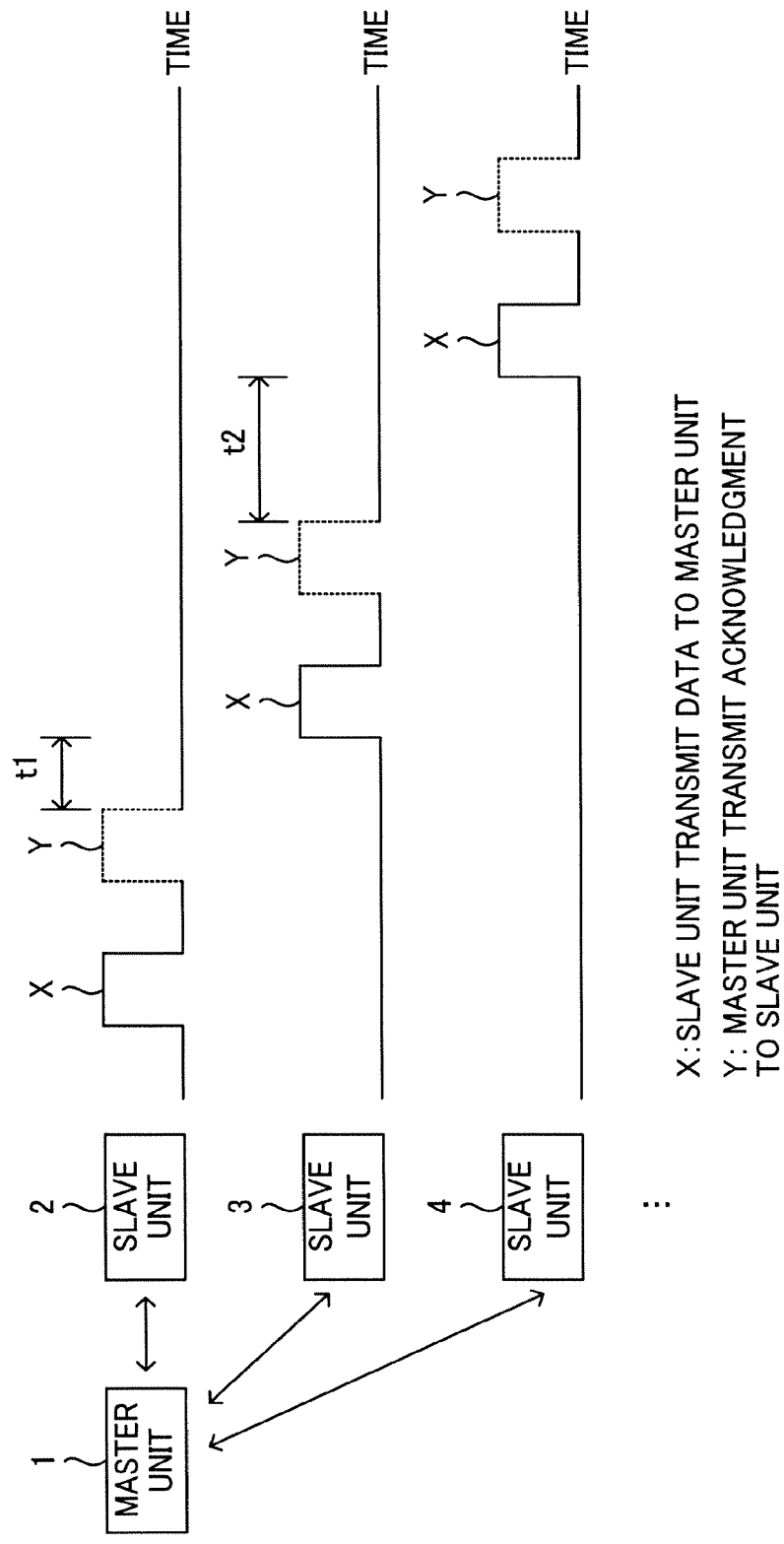
FIG. 1 is a timing chart of data transmission of a master unit and slave units.

It is assumed that, in a short range wireless communication, slave units 2 to 4 transmit data to a master unit 1 in turn and receive an acknowledgment (Ack) from the master unit 1, as illustrated in FIG. 1. In FIG. 1, a mark "X" indicates a period when the slave unit transmits the data to the master unit, and a mark "Y" indicates a period when the master unit transmits the acknowledgment to the slave unit. Each of marks "t1" and "t2" correspond to a period after transmission from the master unit is completed until a certain slave unit begins data transmission. The data transmission from another slave unit cannot be performed during a period when the certain slave unit transmits the data to the master unit or the master unit transmits the acknowledgment to the certain slave unit, and therefore a period such as the "t1" needs to be set so that the communications of different slave units do not overlap with each other. In a situation where the respective slave units are not synchronized with each other, each slave unit begins the data transmission according to the judgment of oneself. In this case, the period after a certain slave unit completes the communication with the master unit until another slave unit begins the communication with the master unit may become indefinite. In an example of FIG. 1, the period t1 after the master unit 1 transmits the acknowledgment to the slave unit 2 until a slave unit 3 transmits the data to the master unit 1 differs from the period t2 after the master unit 1 transmits the acknowledgment to the slave unit 3 until the slave unit 4 transmits the data to the master unit 1. For this reason, depending on the setting of the period such as the t1, it takes a long time until the main unit completes the communication with the plurality of slave units.

Moreover, when each of the slave units 2 to 4 includes a GPS (Global Positioning System) module, it can transmit the data to the master unit 1 at a predetermined time. In this case, system times set in the inside of the slave units 2 to 4 are synchronized with each other, and a time necessary for the whole communication can be shortened. However, the manufacturing cost of the slave units 2 to 4 increases, and the power consumption of the slave units 2 to 4 increases. Moreover, when the GPS module is used, it is not easy to receive an electric wave of the GPS in doors.

A description will now be given of an embodiment according to the present invention with reference to drawings.

Figure 2:
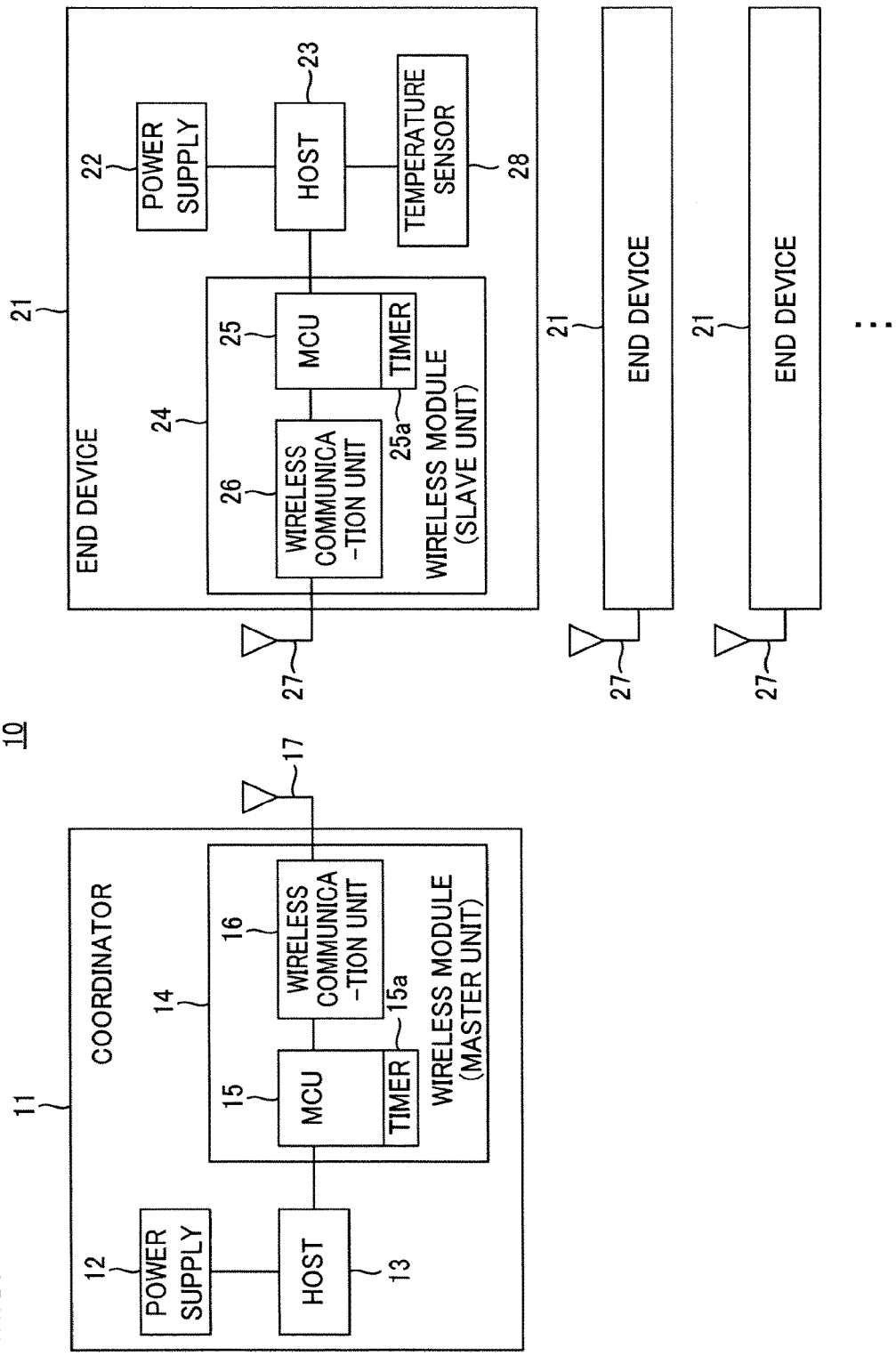
FIG. 2 is a diagram illustrating the configuration of a wireless communication system according to a present embodiment.

FIG. 2 is a diagram illustrating the configuration of a wireless communication system according to a present embodiment.

A wireless communication system 10 according to the embodiment includes a coordinator 11 and a plurality of end devices 21. The coordinator 11 includes a power supply 12, a host 13 and a wireless module 14. The power supply 12 is a battery or an AC power supply. The host 13 is a mobile terminal, a computer or an electric home appliance. The wireless module 14 includes a microcontroller unit (MCU) 15 that controls the whole operation of the wireless module 14, and a wireless communication unit 16 that converts transmission data into an electric wave, converts a received electric wave into data, and performs various signal processing. The MCU 15 includes a timer 15a. An antenna 17 is connected to the wireless communication unit 16.

The wireless module 14 is connected to the host 13, but may be built in the host 13. The wireless module 14 may be removable from the host 13. The MCU 15 and the wireless communication unit 16 serve as a transmitter, a receiver, a first transmitter and a first receiver.

The end device 21 includes a power supply 22, a host 23, a wireless module 24 and a temperature sensor 28. The power supply 22 is a battery or an AC power supply. The host 23 is a mobile terminal, a computer or an electric home appliance. The wireless module 24 includes a MCU 25 that controls the whole operation of the wireless module 24, and a wireless communication unit 26 that converts transmission data into the electric wave, converts the received electric wave into the data, and performs various signal processing. The MCU 25 includes a timer 25a. An antenna 27 is connected to the wireless communication unit 26. The temperature sensor 28 measures a temperature of the place where the end device 21 is put. The end device 21 transmits temperature data measured by the temperature sensor 28 to the coordinator 11 via the wireless module 24. The MCU 25 and the wireless communication unit 26 serve as a second transmitter and a second receiver.

The end device 21 may include other kind of sensor such as a velocity sensor as substitute for the temperature sensor 28. The end device 21 does not need to include the host 23, and the temperature sensor 28 may be directly connected to the MCU 25 in the wireless module 24. The wireless module 24 is connected to the host 23, but may be built in the host 23. Moreover, the wireless module 24 may be detachable from the host 23.

Each of the wireless modules 14 and 24 is used for a specified low power radio using a frequency band of 920 MHz, a wireless LAN (Local Area Network), or "Bluetooth Low Energy" of a low power consumption communication specification. In the present embodiment, the wireless module 14 serves as the master unit, and the wireless module 24 serves as the slave unit. Here, the configuration of the wireless module 14 is the same as that of the wireless module 24, and therefore functions of the master unit and the slave unit can be freely changed by setting. For example, when a setting mode in the MCU 15 of the wireless module 14 is changed to a slave unit mode, the wireless module 14 which has operated by a master unit mode operates by the slave unit mode. On the contrary, when the setting mode in the MCU 25 of the wireless module 24 is changed to the master unit mode, the wireless module 24 which has operated by the slave unit mode operates by the master unit mode. The setting mode in the MCU 15 can be changed by a changing instruction from the host 13 or a button, not shown. The setting mode in the MCU 25 can be changed by a changing instruction from the host 23 or a button, not shown.

The wireless communication system 10 according to the present embodiment is a 1:N (N=an integer of 1 or more) wireless communication system in which the single wireless module 14 as the master unit communicates with the N wireless modules 24 as the slave units in turn. That is, the wireless communication system 10 constitutes a star type wireless communication network. The wireless module 14 is placed on the center of the network, the N wireless modules 24 are placed around the wireless module 14 and connect to the wireless module 14 in turn. The wireless module 14 can perform the wireless communication with all of the wireless modules 24. However, the wireless module 24 cannot necessarily perform the wireless communication with another wireless module 24. For example, when the wireless modules 24 are placed at positions where the electric waves do not reach each other, the wireless modules 24 cannot performs the wireless communication with each other. When the wireless module 14 performs the wireless communication with the certain wireless module 24, another wireless module 24 cannot perform the wireless communication with the wireless module 14.

In the following description, to distinguish the wireless modules 24 included in the plurality of end devices 21, the wireless modules 24 are expressed as wireless modules 24a to 24c. Moreover, in the following description, processing which each of the wireless module 14 and the wireless module 24a to 24c performs is performed by the MCU included in the corresponding module.

Figure 3:
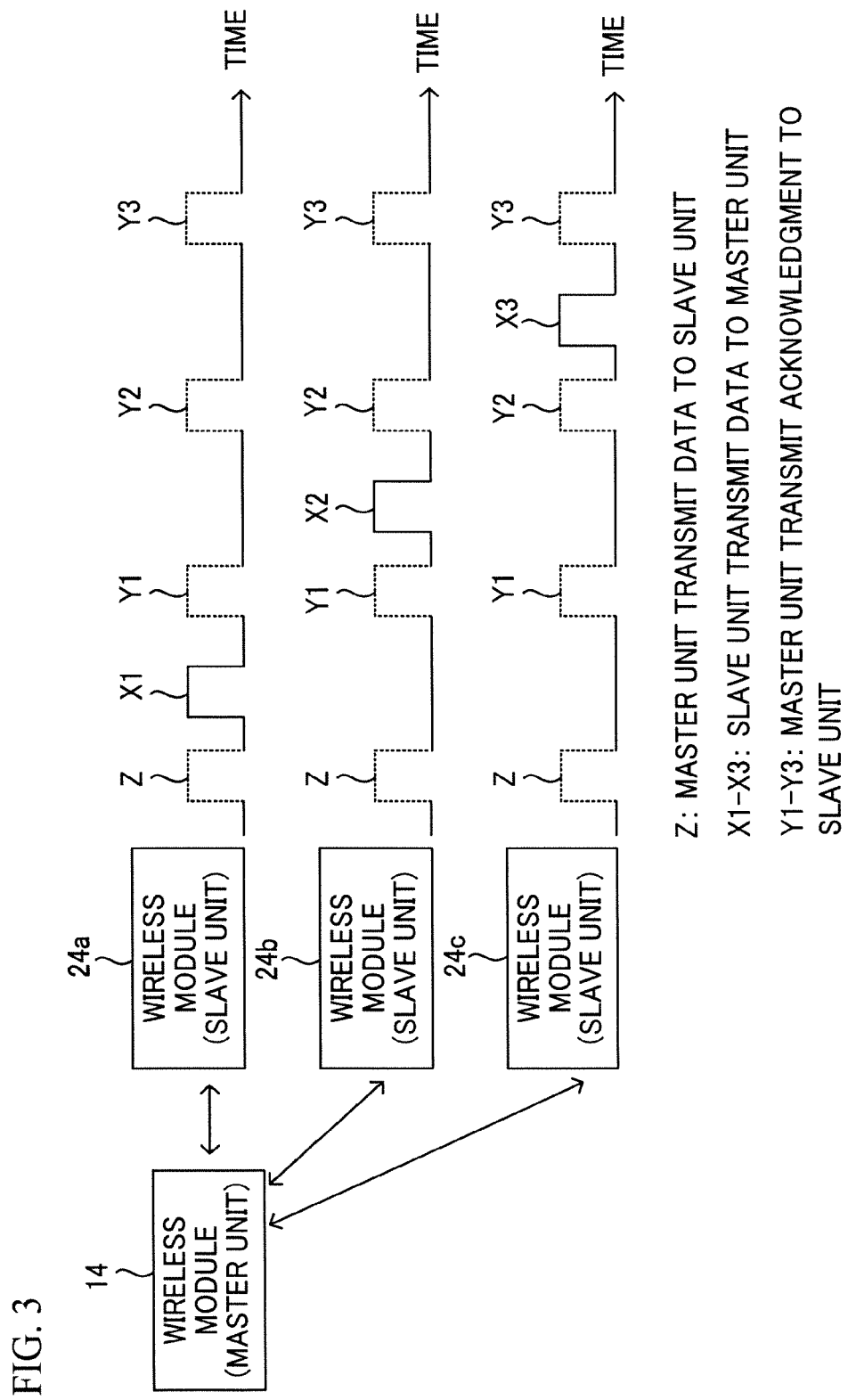
FIG. 3 is a timing chart of data transmission of a wireless module 14 and wireless modules 24a to 24c.
Figure 4:
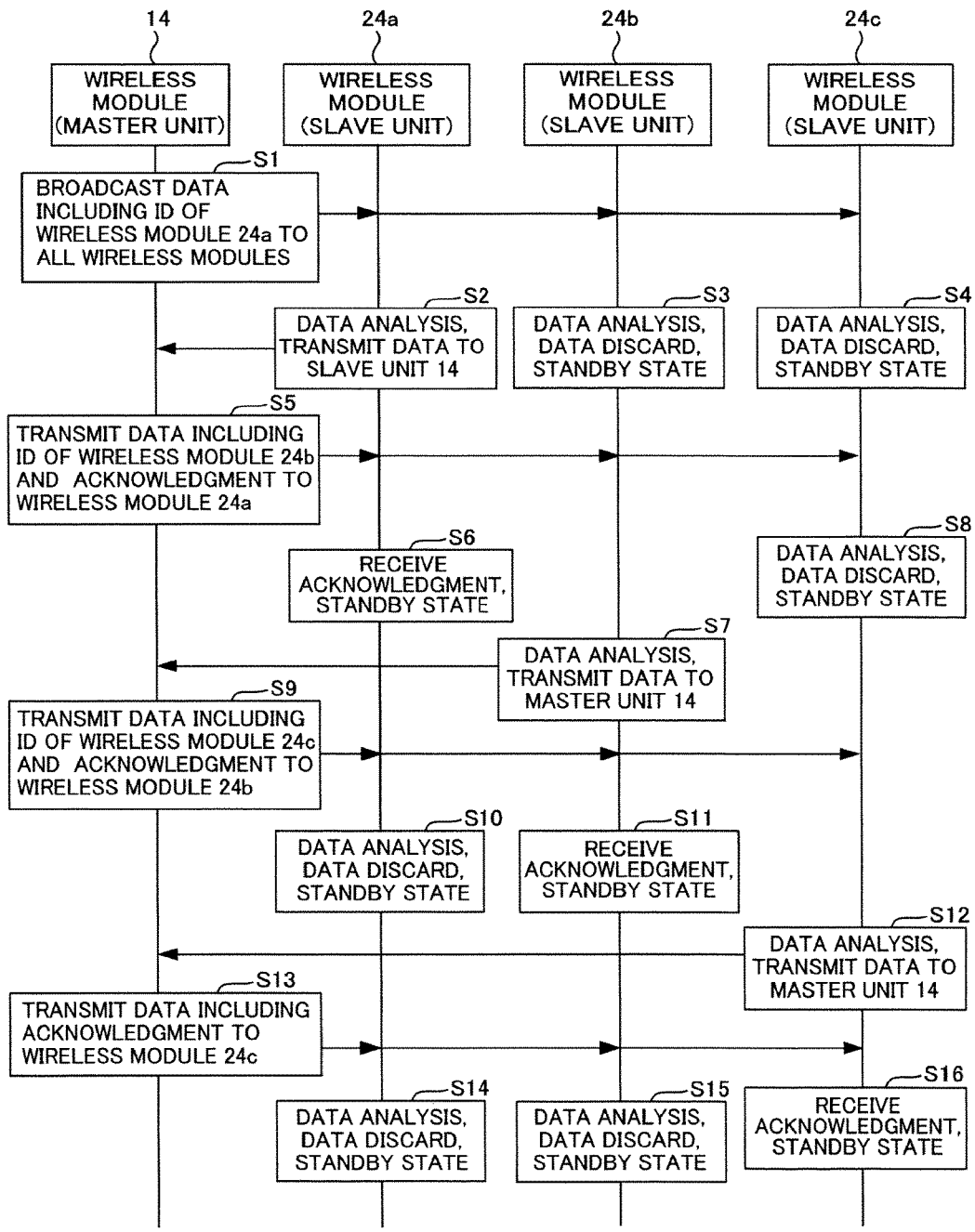
FIG. 4 is a sequence diagram illustrating processing executed by the wireless module 14 and the wireless modules 24a to 24c.

FIG. 3 is a timing chart of data transmission of the wireless module 14 and the wireless modules 24a to 24c. In FIG. 3, an instruction and data transmitted from the wireless module 14 to the wireless modules 24a to 24c are designated by a dotted line, and data transmitted from the wireless modules 24a to 24c to the wireless module 14 is designated by a solid line. FIG. 4 is a sequence diagram illustrating processing executed by the wireless module 14 and the wireless modules 24a to 24c.

First, in FIG. 4, the wireless module 14 broadcasts data including an ID of the wireless module 24a to the wireless modules 24a to 24c (S1). In FIG. 3, designated by "Z" is the data which includes the ID of the wireless module 24a and is transmitted from the wireless module 14 at S1.

Figure 5:
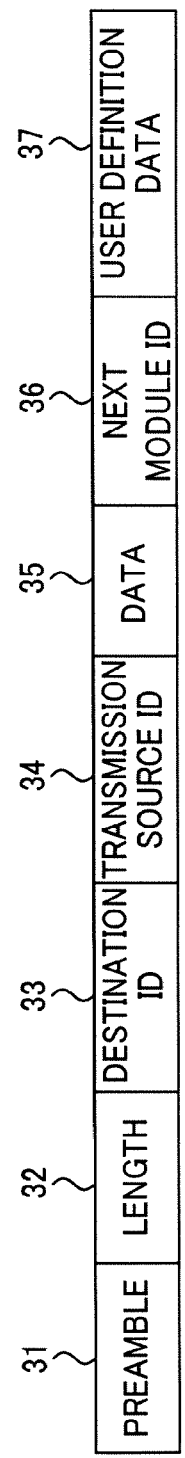
FIG. 5 is a diagram illustrating a format of data transmitted from the wireless module 14 to the wireless modules 24a to 24c.

FIG. 5 is a diagram illustrating a format of the data transmitted from the wireless module 14 to the wireless modules 24a to 24c.

The data transmitted from the wireless module 14 to the wireless modules 24a to 24c includes: a preamble 31 that is a bit string attached to a head of data and is used for the setting of gain adjustment of the wireless communication unit 26; a length 32 that indicates the length of the data; a destination ID 33 that indicates a destination of the data; a transmission source ID 34 that indicates a transmission source of the data; a data 35 that indicates a real data part; a next module ID 36 that indicates a next wireless module 24 which transmits the data to the wireless module 14; and a user definition data 37 that indicates data which a user freely sets. When an ID of the wireless module 24 is included in the next module ID 36, this data becomes a data transmission instruction that instructs the wireless module 24 to transmit the data to the wireless module 14.

In the data transmitted at S1 of FIG. 4, an ID of the wireless module 24a is included in the next module ID 36, and an ID of the wireless module 14 is included in the transmission source ID 34. At this time, an ID indicating a specific wireless module is not included in the destination ID 33. Predetermined bit strings are included in the preamble 31, the length 32, the data 35 and the user definition data 37.

Returning to FIG. 4, the wireless module 24a determines whether the ID of the wireless module 24a is included in the received data. When it is determined that the received data is the data transmission instruction for the wireless module 24a as a result of analysis of the received data, the wireless module 24a immediately transmits data corresponding to the data transmission instruction to the wireless module 14 (S2). In FIG. 3, designated by "X1" is the data which is transmitted from the wireless module 24a at S2 and corresponds to the data transmission instruction. The wireless module 14 receives the data from the wireless module 24a.

The wireless modules 24b and 24c also receive the data including the ID of the wireless module 24a, and analyze the received data. However, the IDs of the wireless modules 24b and 24c are not included in the next module ID 36, and the wireless modules 24b and 24c therefore discard the received data and become standby state (S3, S4).

Next, the wireless module 14 which has received the data from the wireless module 24a transmits to the wireless modules 24a to 24c data including the ID of wireless module 24b and the acknowledgment to the wireless module 24a (S5). In the data transmitted at S5, the ID of the wireless module 24a is included in the destination ID 33, the ID of the wireless module 14 is included in the transmission source ID 34, the ID of the wireless module 24b is included in the next module ID 36, and the acknowledgment to the wireless module 24a is included in the data 35. The predetermined bit strings are included in the preamble 31, the length 32 and the user definition data 37. In FIG. 3, designated by "Y1" is the data which is transmitted from the wireless module 14 at S5 and includes the ID of the wireless module 24b and the acknowledgment to the wireless module 24a.

The wireless module 24a analyzes the data received from the wireless module 14. When it is determined that the received data is the acknowledgment as a result of analysis of the received data, the wireless module 24a becomes the standby state (S6). On the other hand, the wireless module 24b analyzes the received data. In this case, since the ID of the wireless module 24b is included in the next module ID 36, the wireless module 24b determines that the received data is the data transmission instruction for oneself, and immediately transmits data corresponding to the data transmission instruction to the wireless module 14 (S7). In FIG. 3, designated by "X2" is the data which corresponds to the data transmission instruction and is transmitted from the wireless module 24b at S7. The wireless module 14 receives the data from the wireless module 24b. Moreover, the wireless module 24c also analyzes the data received from the wireless module 14. However, since the ID of the wireless module 24c is not included in the destination ID 33 and the next module ID 36, the wireless module 24c discards the received data and becomes the standby state (S8).

Next, the wireless module 14 which has received the data from the wireless module 24b transmits to the wireless modules 24a to 24c data including the ID of wireless module 24c and the acknowledgment to the wireless module 24b (S9). In the data transmitted at S9, the ID of the wireless module 24b is included in the destination ID 33, the ID of the wireless module 14 is included in the transmission source ID 34, the ID of the wireless module 24c is included in the next module ID 36, and the acknowledgment to the wireless module 24b is included in the data 35. The predetermined bit strings are included in the preamble 31, the length 32 and the user definition data 37. In FIG. 3, designated by "Y2" is the data which is transmitted from the wireless module 14 at S9 and includes the ID of the wireless module 24c and the acknowledgment to the wireless module 24b.

The wireless module 24a analyzes the data received from the wireless module 14. In this case, since the ID of the wireless module 24a is not included in the destination ID 33 and the next module ID 36, the wireless module 24a discards the received data and becomes the standby state (S10).

On the other hand, when it is determined that the received data is the acknowledgment for oneself as a result of analysis of the received data, the wireless module 24b becomes the standby state (S11). Since the ID of the wireless module 24c is included in the next module ID 36 of the received data, the wireless module 24c determines that the received data is the data transmission instruction for oneself, and transmits data corresponding to the data transmission instruction to the wireless module 14 (S12). In FIG. 3, designated by "X3" is the data which corresponds to the data transmission instruction and is transmitted from the wireless module 24c at S12. The wireless module 14 receives the data from the wireless module 24c.

Finally, the wireless module 14 which has received the data from the wireless module 24c transmits to the wireless modules 24a to 24c data including the acknowledgment to the wireless module 24c (S13). Although the ID of the wireless module 24c is set to the destination ID 33, the wireless module 14 does not transmit the data transmission instruction to the wireless modules 24a to 24c at S13. Therefore, the ID of the wireless module is not set to the next module ID 36. In FIG. 3, designated by "Y3" is the data which is transmitted from the wireless module 14 at S13 and includes the acknowledgment to the wireless module 24c. Each of the wireless module 24a and 24b analyzes the data received from the wireless module 14. Since the ID of oneself is not included in the destination ID 33 of the received data, each of the wireless module 24a and 24b discards the received data and becomes the standby state (S14, S15). When it is determined that the received data from the wireless module 14 is the acknowledgment for oneself, the wireless module 24c becomes the standby state (S16).

Thus, after the wireless module 14 receives the data from the wireless module 24, the wireless module 14 broadcasts to all the wireless modules 24 data that has incorporated the next module ID 36 into the acknowledgment to the wireless module 24, the next module ID 36 indicating another wireless module 24 which should transmit data to the wireless module 14 next. Therefore, the wireless module 24 specified by the next module ID 36 can determine whether to need to transmit data to the wireless module 14 by analyzing the next module ID 36, and can transmit the data to the wireless module 14. As a result, it is possible to reduce a time required before the master unit completes the communication with the plurality of slave units, compared with a case where the slave unit itself determines timing of transmitting the data to the master unit.

Moreover, in the present embodiment, it is not necessary to synchronize the time setting in the inside of the wireless module 14 with the time setting in the inside of the wireless module 24. Moreover, it is not necessary to synchronize the time settings in the inside of the wireless modules 24 with each other.

In FIG. 4, the wireless module 14 includes the ID of the wireless module 24a in the data first transmitted to the wireless modules 24a to 24c, but the ID included in the data first transmitted to the wireless modules 24a to 24c may be the ID of the wireless module 24b or 24c.

In FIG. 3, the data "Z" includes the ID of the wireless module 24a as the next module ID 36. When the wireless module 24a receives the data "Z", the wireless module 24a immediately transmits the data "X1" corresponding to the data transmission instruction to the wireless module 14. The data "Y1" includes the ID of the wireless module 24b as the next module ID 36. When the wireless module 24b receives the data "Y1", the wireless module 24b immediately transmits the data "X2" corresponding to the data transmission instruction to the wireless module 14. The data "Y2" includes the ID of the wireless module 24c as the next module ID 36. When the wireless module 24c receives the data "Y2", the wireless module 24c immediately transmits the data "X3" corresponding to the data transmission instruction to the wireless module 14.

Unlike the example of FIGS. 3 and 4, when each of the wireless modules 24a to 24c receives data in which the ID of oneself is set as the next module ID 36, each of the wireless modules 24a to 24c may transmit the data corresponding to the data transmission instruction after a time set beforehand in the MCU 25 has elapsed. The elapsed time (i.e., the time set beforehand in the MCU 25) after the slave unit receives the ID of oneself until the slave unit transmits the data corresponding to the data transmission instruction to the master unit is set to the MCU 25 from the host 23.

Figure 6:
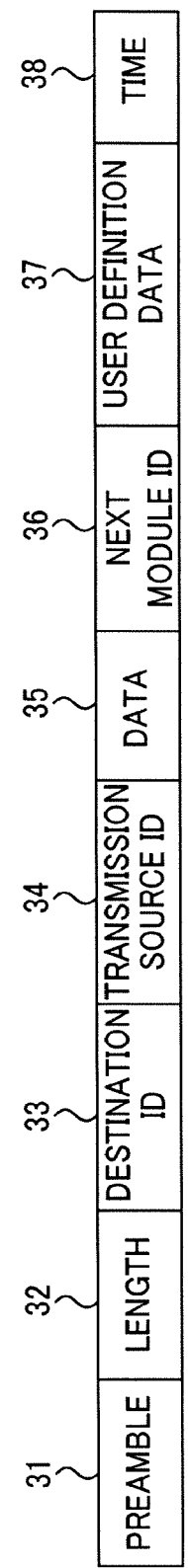
FIG. 6 is a diagram illustrating a variation of the format of the data transmitted from the wireless module 14 to the wireless modules 24a to 24c.

Moreover, an elapsed time 38 indicating a time period after the slave unit receives the ID of oneself until the slave unit transmits the data corresponding to the data transmission instruction to the master unit may be added to the data format illustrated in FIG. 5, as illustrated in FIG. 6. In this case, the elapsed time 38 is included in the data transmitted from the wireless module 14 to the wireless modules 24a to 24c.

Figure 7:
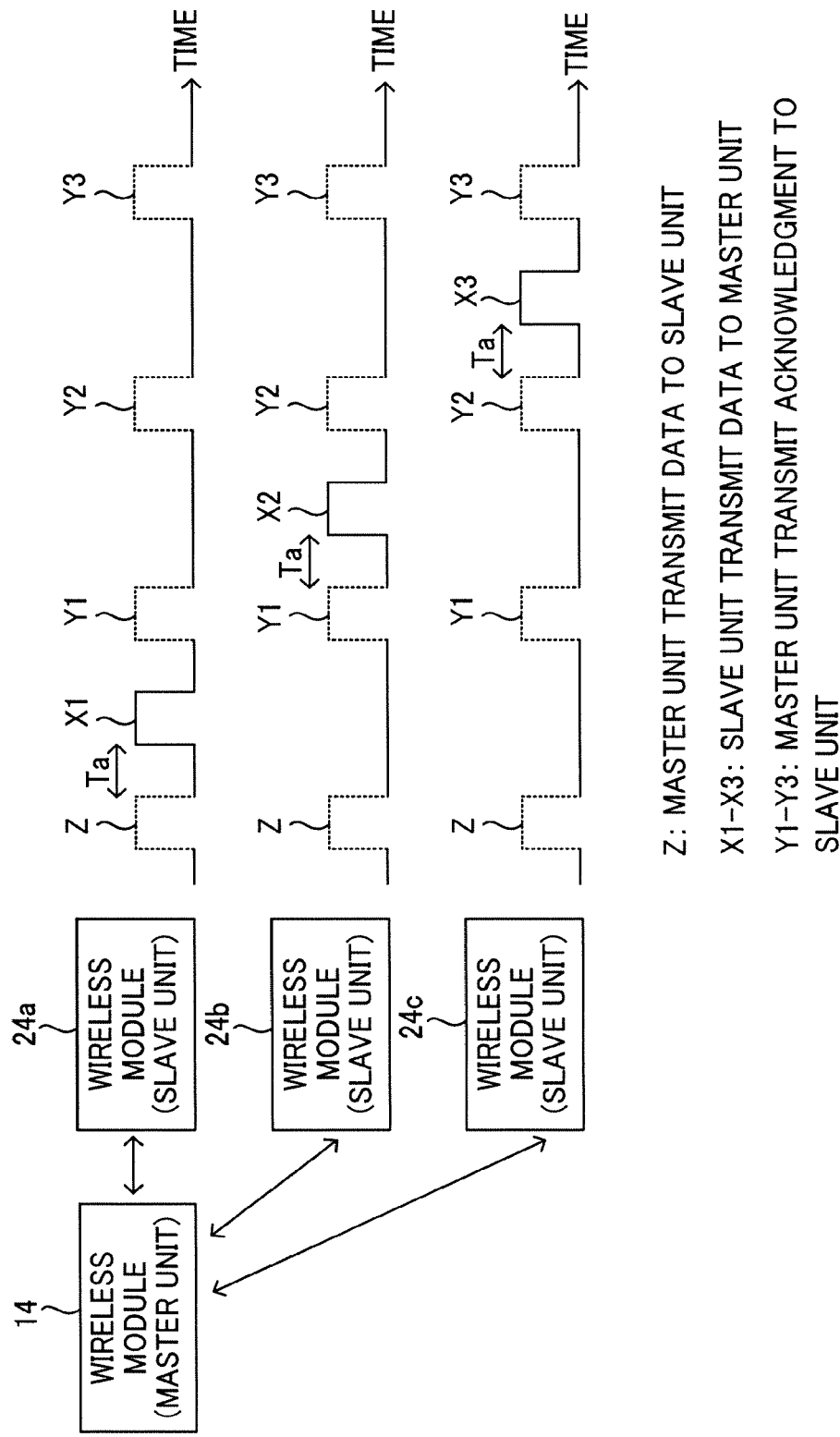
FIG. 7 is a timing chart of the data transmission of the wireless module 14 and the wireless modules 24a to 24c when a time Ta is set as an elapsed time 38.

FIG. 7 is a timing chart of the data transmission of the wireless module 14 and the wireless modules 24a to 24c when a time Ta is set as the elapsed time 38.

In FIG. 7, the data "Z" includes the time Ta as the elapsed time 38, and the ID of the wireless module 24a as the next module ID 36. When the wireless module 24a receives the data "Z", the time Ta elapses, and then the wireless module 24a transmits the data "X1" corresponding to the data transmission instruction to the wireless module 14. The data "Y1" includes the time Ta as the elapsed time 38, and the ID of the wireless module 24b as the next module ID 36. When the wireless module 24b receives the data "Y1", the time Ta elapses, and then the wireless module 24b transmits the data "X2" corresponding to the data transmission instruction to the wireless module 14. The data "Y2" includes the time Ta as the elapsed time 38, and the ID of the wireless module 24c as the next module ID 36. When the wireless module 24c receives the data "Y2", the time Ta elapses, and then the wireless module 24c transmits the data "X3" corresponding to the data transmission instruction to the wireless module 14.

Thus, when each of the wireless modules 24a to 24c receives the data including the time Ta as the elapsed time 38 and the ID of oneself as the next module ID 36, the time Ta elapses, and then each of the wireless modules 24a to 24c transmits the data corresponding to the data transmission instruction to the wireless module 14. Also in this case, it is possible to reduce a time required before the master unit completes the communication with the plurality of slave units.

Figure 8:
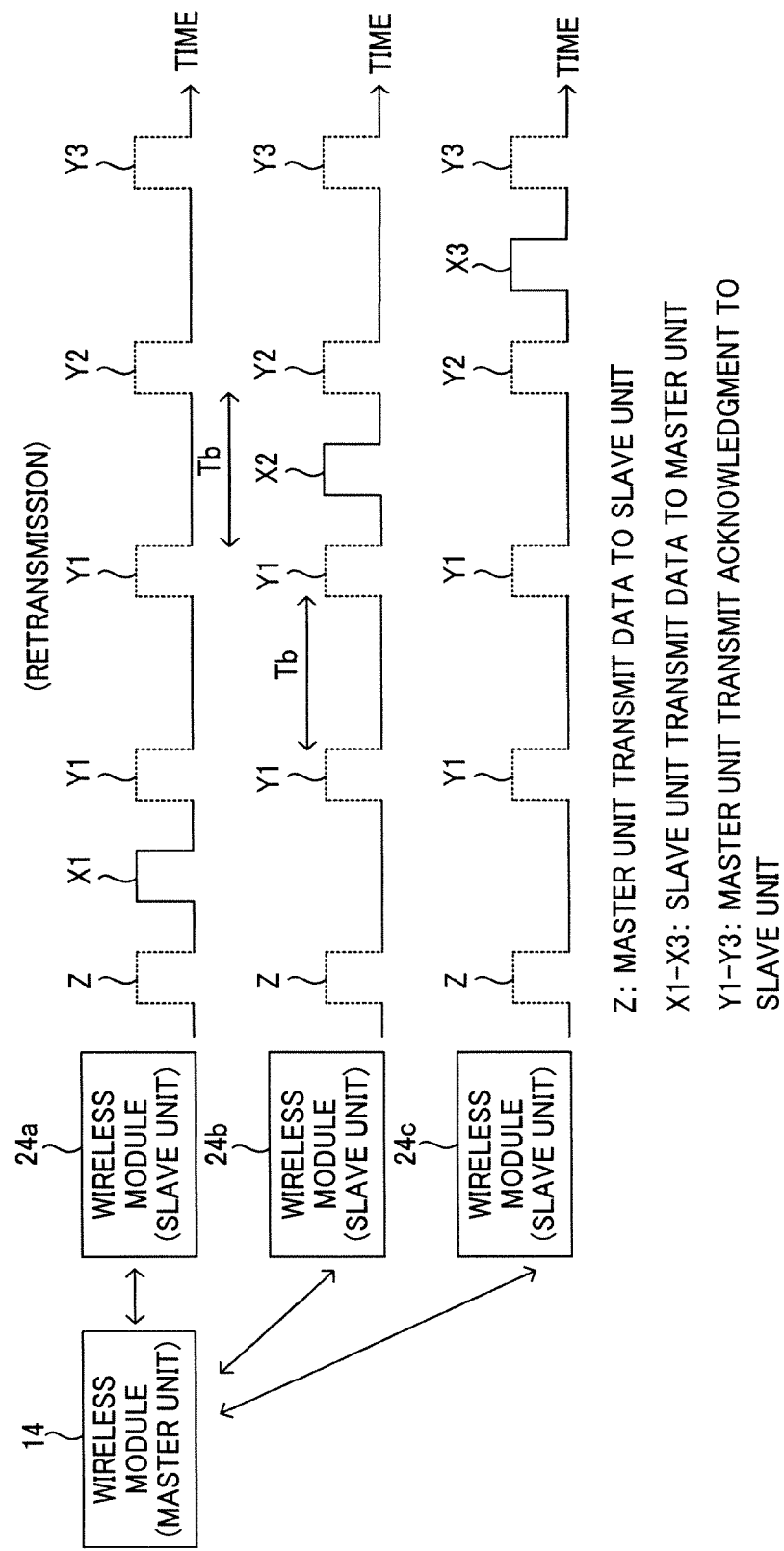
FIG. 8 is a timing chart illustrating a variation of the data transmission of the wireless module 14 and the wireless modules 24a to 24c.

FIG. 8 is a timing chart illustrating a variation of the data transmission of the wireless module 14 and the wireless modules 24a to 24c.

In FIG. 8, after first transmitting the data "Y1" indicating the ID of the wireless module 24b and the acknowledgment to the wireless module 24a to the wireless modules 24a to 24c, the wireless module 14 cannot receive the data "X2" corresponding to the data transmission instruction from the wireless module 24b during a time Tb. For this reason, the wireless module 14 transmits the data "Y1" to the wireless modules 24a to 24c again after the time Tb has elapsed. In an example of FIG. 8, after retransmitting the data "Y1", the wireless module 14 normally receives the data "X2" corresponding to the data transmission instruction from the wireless module 24b.

Thus, when the communication between the wireless modules 14 and 24b is normalized by retransmitting the data "Y1", it is not necessary to reboot the wireless modules 14 and 24b. As a result, it is possible to shorten a time required for the whole communication.

The time Tb for requiring the wireless modules 24a to 24c to retransmit the data corresponding to the data transmission instruction is set to the MCU 15 of the wireless module 14 from the host 13.

Figure 9:
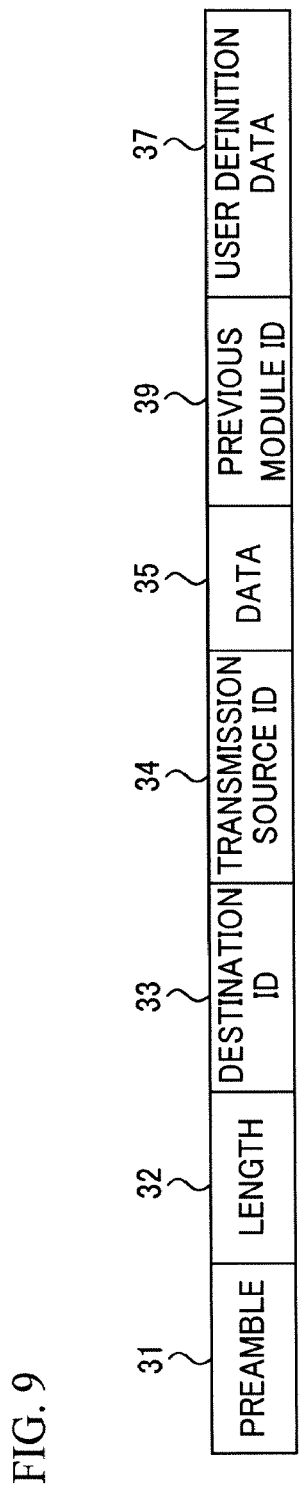
FIG. 9 is a diagram illustrating a variation of the format of the data transmitted from the wireless module 14 to the wireless modules 24a to 24c.

FIG. 9 is a diagram illustrating a variation of the format of the data transmitted from the wireless module 14 to the wireless modules 24a to 24c. Corresponding parts to those in the format of FIG. 5 are designated by the same reference numerals, and description thereof is omitted.

The data illustrated in FIG. 9 includes a previous module ID 39 indicating, immediately before the data is transmitted to the wireless modules 24a to 24c, the wireless module 24 which has transmitted data to the wireless module 14. The previous module ID 39 serves as information indicating that the data of FIG. 9 is the acknowledgment to the wireless module 24 which has the most recently transmitted the data to the wireless module 14.

In FIG. 5, the destination ID 33 indicates a destination of the acknowledgment with respect to the data received from the wireless module 24. However, in FIG. 9, the destination ID 33 indicates a destination of the data transmission instruction. Then, the data transmission instruction enters in the data 35 of FIG. 9.

Hereinafter, a description will given of a timing chart of the data transmission of the wireless module 14 and the wireless modules 24a to 24c in FIG. 3 with the use of the data format of FIG. 9.

It is assumed that the data "Z" transmitted from the wireless module 14 is the data transmission instruction with respect to the wireless module 24a. In this case, the ID of the wireless module 24a is included in the destination ID 33 of the data "Z", the ID of the wireless module 14 is included in the transmission source ID 34, and the data transmission instruction is included in the data 35. Here, there is no wireless module 24 which has transmitted data to the wireless module 14 before the transmission of the data "Z", and therefore the previous module ID 39 is empty data. The predetermined bit strings are included in the preamble 31, the length 32 and the user definition data 37.

When the data "Z" is transmitted to the wireless modules 24a to 24c, the wireless module 24a whose ID is set to the destination ID 33 transmits the data "X1" corresponding to the data transmission instruction to the wireless module 14. Since each of the IDs of the wireless modules 24b and 24c is not included in the destination ID 33 and the previous module ID 39, each of the wireless modules 24b and 24c discards the data "Z" and becomes the standby state.

Next, the wireless module 14 transmits the data "Y1" as the acknowledgment to the wireless module 24a and as the data transmission instruction to the wireless module 24. The ID of the wireless module 24b is included in the destination ID 33 of the data "Y1", the ID of the wireless module 14 is included in the transmission source ID 34, and the data transmission instruction is included in the data 35. Since the wireless module 24a has the most recently transmitted the data "X1" to the wireless module 14, the ID of the wireless module 24a is included in the previous module ID 39. The predetermined bit strings are included in the preamble 31, the length 32 and the user definition data 37.

When the data "Y1" is transmitted to the wireless modules 24a to 24c, the ID of the wireless module 24a is included in the previous module ID 39. Therefore, the wireless module 24a determines that the data "Y1" is the acknowledgment, and becomes the standby state. Moreover, since the ID of the wireless module 24b is included in the destination ID 33, the wireless module 24b transmits the data "X2" corresponding to the data transmission instruction to the wireless module 14. Since the ID of the wireless module 24c is not included in the destination ID 33 and the previous module ID 39, the wireless module 24c discards the data "Y1" and becomes the standby state.

Next, the ID of the wireless module 24c is included in the destination ID 33 of the data "Y2", the ID of the wireless module 14 is included in the transmission source ID 34, and the data transmission instruction is included in the data 35. Since the wireless module 24b has the most recently transmitted the data "X2" to the wireless module 14, the ID of the wireless module 24b is included in the previous module ID 39. The predetermined bit strings are included in the preamble 31, the length 32 and the user definition data 37.

When the data "Y2" is transmitted to the wireless modules 24a to 24c, the ID of the wireless module 24a is not included in the destination ID 33 and the previous module ID 39. Therefore, the wireless module 24a discards the data "Y2" and becomes the standby state. Since the ID of the wireless module 24b is included in the previous module ID 39, the wireless module 24b determines that the data "Y2" is the acknowledgment, and becomes the standby state. Since the ID of the wireless module 24c is included in the destination ID 33, the wireless module 24c transmits the data "X3" corresponding to the data transmission instruction to the wireless module 14.

Next, the empty data is included in the destination ID 33 of the data "Y3", the ID of the wireless module 14 is included in the transmission source ID 34, and the data transmission instruction is included in the data 35. Since the wireless module 24c has the most recently transmitted the data "X3" to the wireless module 14, the ID of the wireless module 24c is included in the previous module ID 39. The predetermined bit strings are included in the preamble 31, the length 32 and the user definition data 37.

When the data "Y3" is transmitted to the wireless modules 24a to 24c, the IDs of the wireless modules 24a and 24b are not included in the destination ID 33 and the previous module ID 39. Therefore, each of the wireless modules 24a and 24b discards the data "Y3" and becomes the standby state. Since the ID of the wireless module 24c is included in the previous module ID 39, the wireless module 24c determines that the data "Y3" is the acknowledgment, and becomes the standby state.

Thus, after the wireless module 14 receives the data from the wireless module 24, the wireless module 14 transmits to all the wireless modules 24 data that incorporated the previous module ID 39 into the data transmission instruction to a next wireless module 24, the previous module ID 39 indicating the wireless module 24 has the most recently transmitted the data to the wireless module 14. Therefore, the wireless module 24 specified by the destination ID 33 can determine whether to need to transmit the data to the wireless module 14, and can immediately transmit the data to the wireless module 14. Then, the wireless module 24 specified by the previous module ID 39 receives the acknowledgment, and can confirm that the data transmission has succeeded. As a result, it is possible to reduce the time required before the master unit completes the communication with the plurality of slave units, compared with a case where the slave unit transmits the data to the master unit at appropriate timing.

Moreover, also when the data format of FIG. 9 is used, it is not necessary to synchronize the time setting in the inside of the wireless module 14 with the time setting in the inside of the wireless module 24. Moreover, it is not necessary to synchronize the time settings in the inside of the wireless modules 24 with each other.

Moreover, the elapsed time 38 indicating the time period after the slave unit receives the ID of oneself until the slave unit transmits the data corresponding to the data transmission instruction to the master unit may be added to the data format of FIG. 9, as illustrated in FIG. 6. Also when the data format of FIG. 9 is used and the wireless module 14 cannot receive the data "X2" corresponding to the data transmission instruction from the wireless module 24b during the predetermined time Tb, the wireless module 14 may transmit the data "Y1" to the wireless modules 24a to 24c again after the time Tb has elapsed, as illustrated in FIG. 8.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A wireless communication device that communicates with a plurality of slave units, comprising:
   a processor generating a data transmission instruction signal;
   a transmitter that transmits to the plurality of slave units the data transmission instruction signal instructing a first slave unit among the plurality of slave units to transmit data, the data transmission instruction signal having a first field set to identification information of the first slave unit, a second field set to an acknowledgment in response to receiving data from a second slave unit among the plurality of slave units, and a third field set to identification information of the second slave unit indicating the acknowledgement is destined for the second slave unit;
   a receiver that receives the data corresponding to the data transmission instruction signal from the first slave unit,
   wherein the first slave unit transmits the data after determining the first field of the data transmission instruction signal corresponds to the first slave unit;
   the processor generating a next data transmission instruction signal;
   the transmitter transmits to the plurality of slave units the next data transmission instruction signal instructing a third slave unit among the plurality of slave units to transmit next data when the receiver receives data from the first slave unit, the next data transmission instruction signal having the first field set to identification information of the third slave unit, the second field set to another acknowledgement in response to receiving data from the first slave unit, and the third field set to identification information of the first slave unit indicating the another acknowledgement is destined for the first slave unit; and
   the receiver that receives the next data corresponding to the next data transmission instruction signal from the third slave unit, wherein the third slave unit transmits the next data after determining the first field of the next data transmission instruction signal corresponds to the third slave unit.

2. The wireless communication device as claimed in claim 1, wherein the next data transmission instruction signal has a fourth field set to time information indicating a time required after the third slave unit receives the next data transmission instruction signal until the third slave unit transmits data corresponding to the next data transmission instruction signal to the wireless communication device.

3. The wireless communication device as claimed in claim 1, wherein when the receiver does not receive data corresponding to the next data transmission instruction signal from the third slave unit during a predetermined time, the transmitter retransmits the next data transmission instruction signal to the plurality of slave units.

4. A wireless communication system having a master unit and a plurality of slave units, comprising:
   the master unit including:
   a processor generating a data transmission instruction signal;
   a first transmitter that transmits to the plurality of slave units the data transmission instruction signal instructing a first slave unit among the plurality of slave units to transmit data, the data transmission instruction signal having a first field set to identification information of the first slave unit, a second field set to an acknowledgment in response to receiving data from a second slave unit among the plurality of slave units, and a third field set to identification information of the second slave unit indicating the acknowledgement is destined for the second slave unit;
   a first receiver that receives the data corresponding to the data transmission instruction signal from the first slave unit,
   wherein the first slave unit transmits the data after determining the first field of the data transmission instruction signal corresponds to the first slave unit;
   the processor generating a next data transmission instruction signal;
   the first transmitter transmits to the plurality of slave units the next data transmission instruction signal instructing a third slave unit among the plurality of slave units to transmit next data when the first receiver receives data from the first slave unit, the next data transmission instruction signal having the first field set to identification information of the third slave unit, the second field set to another acknowledgement in response to receiving data from the first slave unit, and the third field set to identification information of the first slave unit indicating the another acknowledgement is destined for the first slave unit; and
   the first receiver that receives the next data corresponding to the next data transmission instruction signal from the third slave unit, wherein the third slave unit transmits the next data after determining the first field of the next data transmission instruction signal corresponds to the third slave unit;
   each of the plurality of slave units including:
   a second receiver that receives the data transmission instruction signal and the next data transmission instruction signal; and
   a second transmitter that transmits data corresponding to the data transmission instruction signal to the master unit when the first field of the data transmission instruction signal corresponds to one of the plurality of slave units including the second transmitter, and transmits next data corresponding to the next data transmission instruction signal to the master unit when the first field of the next data transmission instruction signal corresponds to one of the plurality of slave units including the second transmitter.

5. The wireless communication system as claimed in claim 4, wherein when the first field of the data transmission instruction signal corresponds to one of the plurality of slave units including the second transmitter, the second transmitter transmits data corresponding to the data transmission instruction signal to the master unit after a predetermined time has elapsed,
   when the first field of the next data transmission instruction signal corresponds to one of the plurality of slave units including the second transmitter, the second transmitter transmits data corresponding to the next data transmission instruction signal to the master unit after the predetermined time has elapsed.

6. The wireless communication device as claimed in claim 1, wherein the processor generates an initial data transmission instruction signal that the transmitter transmits for a first time, the initial data transmission instruction signal having the first field set to identification information of the second slave unit among the plurality of slave units and the third field that is not set.

7. The wireless communication system as claimed in claim 4, wherein the processor generates an initial data transmission instruction signal that the first transmitter transmits for a first time, the initial data transmission instruction signal having the first field set to identification information of the second slave unit among the plurality of slave units and the third field that is not set, and the second transmitter that transmits data corresponding to the initial data transmission instruction signal when the first field of the initial data transmission instruction signal corresponds to one of the plurality of slave units including the second transmitter.

* * * * *